(12) United States Patent
Watkins et al.

(10) Patent No.: US 6,998,570 B1
(45) Date of Patent: Feb. 14, 2006

(54) BEAM WELDING APPARATUS AND METHODS

(75) Inventors: William B. Watkins, Tequesta, FL (US); Joseph C. Barone, Palm Beach Gardens, FL (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/982,677

(22) Filed: Nov. 4, 2004

(51) Int. Cl.
*B23K 26/20* (2006.01)
*B23K 26/03* (2006.01)
*B23K 15/00* (2006.01)
*G01B 11/24* (2006.01)

(52) U.S. Cl. .......................... 219/121.63; 219/121.13; 219/121.14; 219/121.64; 219/121.83; 356/496

(58) Field of Classification Search .......... 219/121.63, 219/121.82, 121.83, 121.13, 121.14, 121.64; 356/496, 511

See application file for complete search history.

(56) References Cited

U.S. PATENT DOCUMENTS

| | | | | |
|---|---|---|---|---|
| 5,282,313 A | * | 2/1994 | Podhorsky et al. | .... 29/890.046 |
| 6,000,600 A | * | 12/1999 | Erikson et al. | ............. 228/212 |
| 6,191,383 B1 | * | 2/2001 | Jense | .................... 219/121.63 |
| 2002/0153130 A1 | * | 10/2002 | Okamoto et al. | ........... 165/170 |

OTHER PUBLICATIONS

Damgaard et al., Laser Welded Sandwich Nozzle Extension for the RL60 Engine, AIAA, Jul., 2003, Reston, VA.

* cited by examiner

*Primary Examiner*—Geoffrey S. Evans
(74) *Attorney, Agent, or Firm*—Bachman & LaPointe, P.C.

(57) ABSTRACT

An apparatus and method may be used for welding a first panel to a second panel, the first panel having an inboard side partially contacting the second panel and an opposite outboard side. The apparatus has a welding beam generator. The apparatus reduces a pressure along the inboard side of the panel relative to an adjacent pressure along the outboard side so as to produce inward deflection of the first panel along a first portion of the first panel not contacting the second panel relative to a second portion. The apparatus has locates, based on said deflection, at least one of said first portion or said second portion.

21 Claims, 2 Drawing Sheets

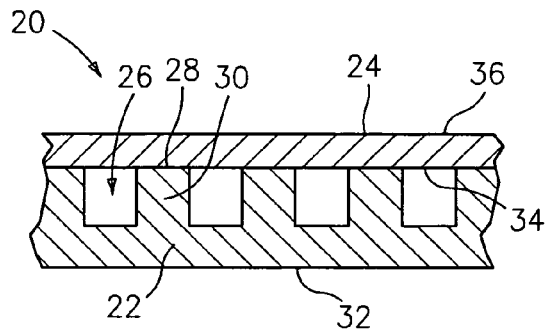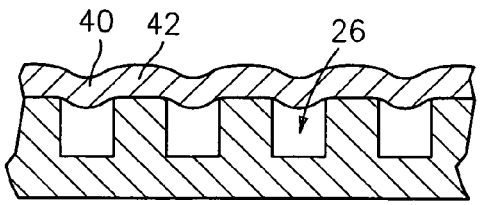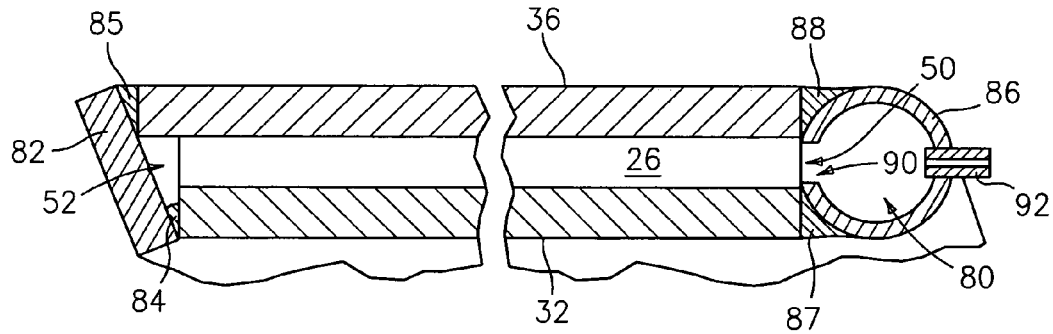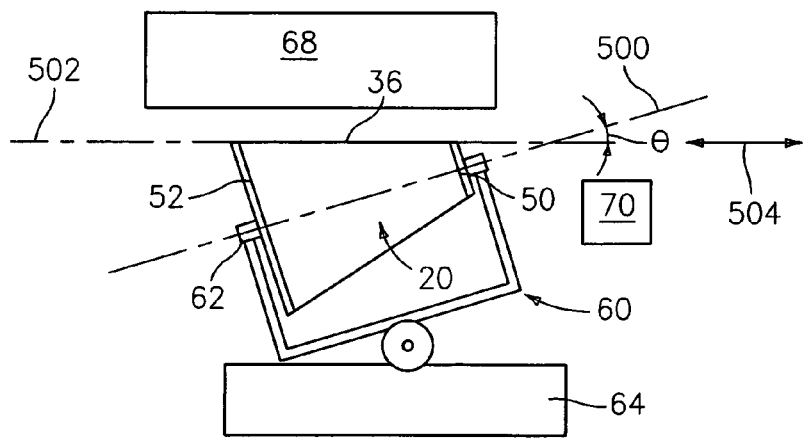
FIG. 1
FIG. 2
FIG. 4
FIG. 3

BEAM WELDING APPARATUS AND METHODS

BACKGROUND OF THE INVENTION

The invention relates to welding. More particularly, the invention relates to beam welding of a first item to a second item at hidden discrete contact locations.

The difficulty of blind welding has plagued the field of milled channel heat exchangers. One example of a milled channel heat exchanger is the wall of a rocket nozzle as shown in Damgaard et al. "Laser Welded Sandwich Nozzle Extension for the RL60 Engine" (AIAA-2003-4478), AIAA, Reston, Va., 2003, the disclosure of which is incorporated by reference herein as if set forth at length. In an exemplary milled channel heat exchanger, an array of channels are milled in a base material leaving ribs between the channels. A cover sheet or panel is placed atop the ribs and welded thereto (e.g., via laser or e-beam from the side of the sheet facing away from the base layer). Registering the welding beam with the ribs has proven difficult. X-ray apparatus have been proposed. X-ray devices, however, may be expensive and difficult to use.

SUMMARY OF THE INVENTION

One aspect of the invention involves an apparatus for welding a first panel to a second panel, the first panel having an inboard side partially contacting the second panel and an opposite outboard side. The apparatus has means for generating a welding beam. The apparatus has means for reducing a pressure along the inboard side of the panel relative to an adjacent pressure along the outboard side so as to produce inward deflection of the first panel along a first portion of the first panel not contacting the second panel relative to a second portion. The apparatus has means for locating based on said deflection at least one of said first portion or said second portion.

In some implementations, the apparatus may have means for directing the welding beam to said second portion responsive to said locating. The apparatus may have means for locating comprises a laser holography apparatus. The means for locating may comprise: a laser holography apparatus; and a video display displaying a holography fringe pattern from said laser holography apparatus. The means for generating the welding beam may comprise at least one of a laser generator and an electron gun. The means for reducing the pressure may comprise a plenum element welded to the first and second elements.

Another aspect of the invention involves an apparatus for welding a first panel to a second panel, the first panel having an inboard side partially contacting the second panel and an opposite outboard side. The apparatus has a fixture dimensioned to engage and hold an assembly of the first panel and second panel. The apparatus has a welding beam generator positioned to direct a welding beam to the assembly. The apparatus has a pump coupled to the fixture so as to reduce a pressure along the inboard side of the first panel relative to an adjacent pressure along the outboard side so as to produce inward deflection of the first panel along a first portion of the first panel not contacting the second panel relative to a second portion. The apparatus has a first laser generator positioned to direct a first laser beam to the outboard side of the first panel. The apparatus has a detector positioned to detect reflection of the first laser beam.

In some implementations, the apparatus may have a controller coupled to the detector and the welding beam generator and configured to direct the welding beam to said second portion responsive to detection of said reflection. The welding beam generator may comprise a second laser generator. The welding beam generator may comprise an electron beam generator. The welding beam generator may comprise an actuator for traversing the welding beam across the first panel. The apparatus may be in combination with the first panel and second panel. The first panel may be an essentially flat sheet and the second panel may have an essentially flat first side and a second side having a plurality of parallel ribs. The first panel may be essentially frustoconical and the second panel may have an essentially smooth frustoconical first side and a second side having a plurality of ribs.

Another aspect of the invention involves a method for welding a first panel to a second panel, the first panel having an inboard side partially contacting the second panel and an opposite outboard side. A pressure along the inboard side of the first panel is reduced relative to an adjacent pressure along the outboard side so as to produce inward deflection of the first panel along a first portion of the first panel not contacting the second panel relative to a second portion. Based on said deflection, at least one of said first portion and said second portion is located. Responsive to said locating, a welding beam is directed to said second portion.

In some implementations, the locating may comprise laser holography. The directing may cause the welding beam to weld the first panel to the second panel along a plurality of parallel ribs of the second panel. At least one sacrificial sealing element may be welded to the first and second panels. The sealing element may be an annular plenum element. The first and second panels may essentially form a body of revolution about a longitudinal axis. The first and second panels may be progressively incrementally rotated essentially about the longitudinal axis to permit successive welding of individual locations forming the first portion. The individual locations may be associated with longitudinal ribs of the second panel and the welding comprises essentially longitudinally translating the first and second panels relative to the welding beam. The welding may further comprise dynamically correcting for error in rib alignment by rotating the first and second panels essentially about the longitudinal axis. A plurality of channels may be milled in the second panel to leave ribs.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 1 is a pre-welding sectional view of a milled channel sandwich precursor for forming a heat exchanger.

FIG. 2 is a sectional view of the precursor of FIG. 1 upon a pressure reduction in the channels.

FIG. 3 is a partially schematic view of a system for welding the precursor of FIG. 1.

FIG. 4 is a partial longitudinal sectional view of the precursor of FIG. 1 assembled to end elements for sealing the channels and subjecting them to reduced pressure.

Like reference numbers and designations in the various drawings indicate like elements.

DETAILED DESCRIPTION

Figure 5:
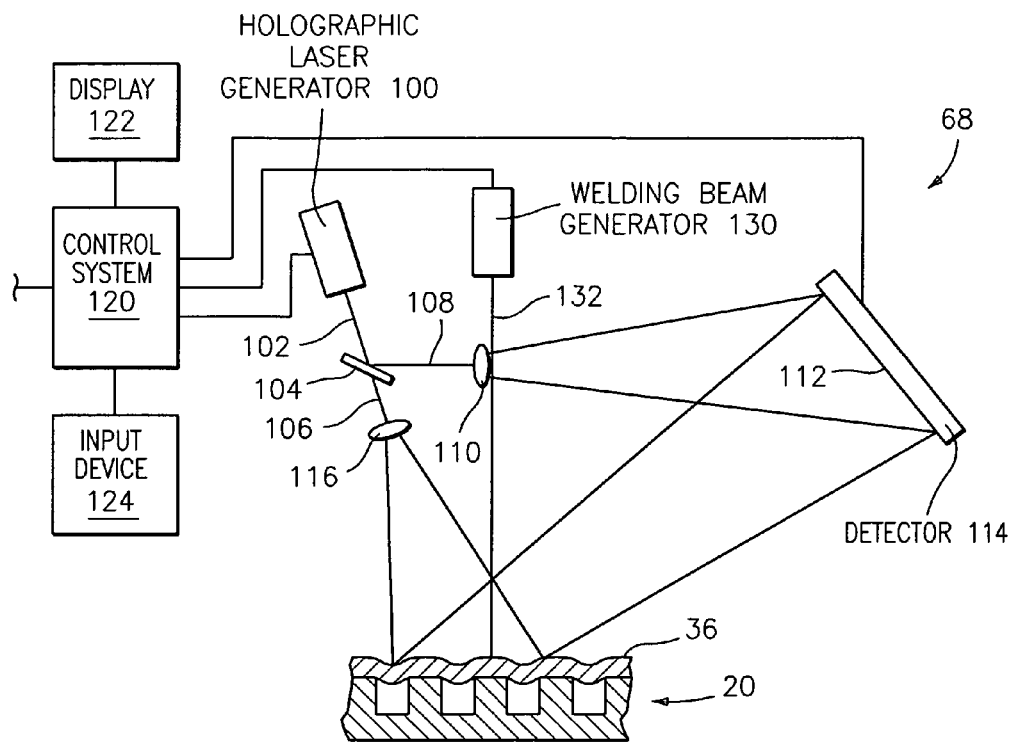
FIG. 5 is a partially schematic view of welding and optical inspection components of the system of FIG. 3.

FIG. 1 shows a sectional view of a sandwich 20 comprising a base layer 22 and a cover layer 24. These layers may be formed of steel, titanium alloy, nickel- or cobalt-based superalloy, or other weldable material. A series of channels 26 have been milled through a first surface 28 of the base layer, leaving a series of ribs 30 and an essentially intact second surface 32. After the milling, the cover layer 24 is assembled to the base layer with a surface 34 or underside of the cover layer contacting the surface 28 along the ribs 30. Relative to the sandwich layering, the surfaces 34 and 28 are thus inboard surfaces and the surface 32 and other cover layer surface 36 are outboard surfaces. The layers may be flat or shaped otherwise. For example, the layers and sandwich may be frustoconical with the channels running longitudinally as in a rocket nozzle precursor (subsequently formed into a bell shape).

According to the present teachings, a pressure within the channels 26 may be reduced relative to a pressure outside of the surface 36 to at least temporarily deform the cover sheet 24, leaving areas 40 where the surface 36 is depressed/recessed relative to areas 42 along the ribs or other intact portions of the base layer. The deformation of the surface 36 facilitates optical techniques for guiding welding beams to locally weld the layers at the ribs.

An exemplary implementation involves the sandwich 20 formed as a frustoconical rocket nozzle precursor (FIG. 3). The precursor extends from a first longitudinal end 50 to a second longitudinal end 52. A longitudinal axis 500 is shown at an angle θ off a local horizontal 502. In the exemplary implementation, θ is also the cone half angle so that an uppermost portion of an exterior surface of the precursor (e.g., of the surface 36) is also horizontal. Accordingly, in the exemplary embodiment, the surface 36 forms a precursor exterior surface and the surface 32 forms a precursor interior surface. A fixture 60 may hold the precursor and may include an actuator (e.g., a motor 62) for rotating the precursor about the axis 500 and an actuator (e.g., a motorized table 64) for translating the precursor (e.g., in a horizontal direction 504 in a common vertical plane with the axis 500). A welding system 68 is schematically shown and is discussed further below. A vacuum pump 70 is provided for reducing the pressure in the channels 26. Many methods exist for reducing the pressure. These may involve various techniques for sealing the channels. FIG. 4 is a longitudinal sectional view of the nozzle precursor sandwich between the first and second ends 50 and 52. In the exemplary embodiment, a plenum 80 is secured at the first end 50 and a sealing/blocking element 82 is secured at the second end 52. The exemplary element 82 is an annular plate secured to the layers 22 and 24 via welds 84 and 85. The exemplary plenum 80 is formed by a pipe 86 welded to the layers 22 and 24 by welds 87 and 88. In the exemplary embodiment, the plenum 80 is formed from initially straight pipe stock, bent into a hoop with its ends welded together. A slot 90 is machined through the pipe positioned to communicate with the channels 26 when installed and welded to the first end. One or more apertures may be machined and fittings 92 installed for connecting to the vacuum pump 70. Due to the welding (for purposes of illustration shown with weld material not intermixed with the original structures of the layers and sealing elements), the precursor may be provided with excess length near each end, permitting the manifold 80 and element 82 to be cut away after ultimate welding along the ribs.

FIG. 5 shows further details of the welding apparatus 68. The exemplary optical detection system of the apparatus 68 utilizes laser holography. A holographic laser generator 100 is positioned to direct an output beam 102 to a beam splitter 104 splitting the beam into first and second portions 106 and 108. The portion 108 serves as a reference passing through a lens 110 on its way to an incident surface 112 of a detector 114. The beam portion 106 passes through a lens 116 and is reflected from the surface 36 to the surface 112. The detector 114 may be connected to a control system 120 which may also be connected to the laser generator 100, to a display 122 and to a user input device 124 (e.g., a keyboard and pointing device). The control system 120 may also be connected to a welding beam generator 130 (e.g., a laser generator or an electron beam (e-beam) generator). The generator 130 directs a welding beam 132 to the surface 36.

Figure 6:
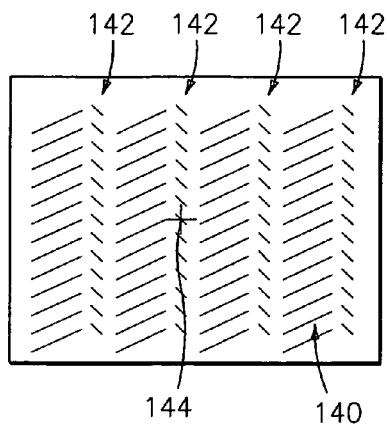
FIG. 6 is a view of a display showing a fringe pattern generated by the optical inspection components of FIG. 5.

FIG. 6 shows an output of the display 122 with a fringe pattern 140 containing portions 142 indicating the presence of ribs. The display may further present an aiming indicia (e.g., cross-hairs 144) indicating an aim point of the beam 132. Automatically, or under user guidance, the control system may maintain alignment of the beam with a selected one of the ribs while traversing the beam along the rib to weld the two layers at the rib. For example, the control system 120 may be coupled to the motor 62 and table 64 to control rotation and position of the precursor sandwich relative to an essentially stationary laser beam. Alternatively, the substrate could be stationary and the laser beam movable by means of an associated actuator (e.g., by moving just the beam 132 such as via rotating a mirror or by moving the welding beam generator alone or in combination with the holography beam 102, its generator, and/or its detector). In hybrid situations, both may be movable. One example of the hybrid situation is where the precursor sandwich is only rotated about the axis 500 while the optical components of the system 68 are traversable in the direction 504. The system may accommodate irregularities (e.g., if nominally longitudinal channels and ribs fall slightly out of longitudinal). Also, the system may accommodate more complex rib and channel geometry.

One or more embodiments of the present invention have been described. Nevertheless, it will be understood that various modifications may be made without departing from the spirit and scope of the invention. For example, details of the particular component to be welded may influence details of any particular implementation. Various existing or yet-developed systems or sub-systems may be utilized. Non-sacrificial sealing systems may be used alternatively to elements such as 80 and 82. Accordingly, other embodiments are within the scope of the following claims.

What is claimed is:

1. An apparatus for welding a first panel to a second panel, the first panel having an inboard side partially contacting the second panel and an opposite outboard side, the apparatus comprising:

means for generating a welding beam;

means for reducing a pressure along the inboard side of the panel relative to an adjacent pressure along the outboard side so as to produce inward deflection of the first panel along a first portion of the first panel not contacting the second panel relative to a second portion; and means for locating based on said deflection at least one of said first portion or said second portion.

2. The apparatus of claim 1 further comprising:
means for directing the welding beam to said second portion responsive to said locating.

3. The apparatus of claim 1 wherein:
the means for locating comprises a laser holography apparatus.

4. The apparatus of claim 1 wherein:
the means for locating comprises: a laser holography apparatus; and a video display displaying a holography fringe pattern from said laser holography apparatus.

5. The apparatus of claim 1 wherein:
the means for generating the welding beam comprises at least one of a laser generator and an electron gun.

6. The apparatus of claim 1 wherein:
the means for reducing the pressure comprise a plenum element welded to the first and second elements.

7. An apparatus for welding a first panel to a second panel, the first panel having an inboard side partially contacting the second panel and an opposite outboard side, the apparatus comprising:
a fixture dimensioned to engage and hold an assembly of the first panel and second panel;
a welding beam generator positioned to direct a welding beam to the assembly;
a pump coupled to the fixture so as to reduce a pressure along the inboard side of the first panel relative to an adjacent pressure along the outboard side so as to produce inward deflection of the first panel along a first portion of the first panel not contacting the second panel relative to a second portion;
a first laser generator positioned to direct a first laser beam to the outboard side of the first panel; and
a detector positioned to detect reflection of the first laser beam.

8. The apparatus of claim 7 further comprising:
a controller coupled to the detector and the welding beam generator and configured to direct the welding beam to said second portion responsive to detection of said reflection.

9. The apparatus of claim 7 wherein:
the welding beam generator comprises a second laser generator.

10. The apparatus of claim 7 wherein:
the welding beam generator comprises an electron beam generator.

11. The apparatus of claim 7 wherein:
the welding beam generator comprises an actuator for traversing the welding beam across the first panel.

12. The apparatus of claim 7 in combination with the first panel and second panel and wherein:
the first panel is an essentially flat sheet; and
the second panel has an essentially flat first side and a second side having a plurality of parallel ribs.

13. A method for welding a first panel to a second panel, the first panel having an inboard side partially contacting the second panel and an opposite outboard side, the method comprising:
reducing a pressure along the inboard side of the first panel relative to an adjacent pressure along the outboard side so as to produce inward deflection of the first panel along a first portion of the first panel not contacting the second panel relative to a second portion;
based on said deflection, locating at least one of said first portion and said second portion; and
responsive to said locating, directing a welding beam to said second portion.

14. The method of claim 13 wherein:
the locating comprises laser holography.

15. The method of claim 13 wherein:
the directing causes the welding beam to weld the first panel to the second panel along a plurality of parallel ribs of the second panel.

16. The method of claim 13 further comprising:
welding at least one sacrificial sealing element to the first and second panels.

17. The method of claim 16 wherein the sealing element is an annular plenum element.

18. The method of claim 13 wherein:
the first and second panels essentially form a body of revolution about a longitudinal axis; and
the first and second panels are progressively incrementally rotated essentially about the longitudinal axis to permit successive welding of individual locations forming the first portion.

19. The method of claim 18 wherein:
the individual locations are associated with longitudinal ribs of the second panel and the welding comprises essentially longitudinally translating the first and second panels relative to the welding beam.

20. The method of claim 19 wherein:
the welding further comprises dynamically correcting for error in rib alignment by rotating the first and second panels essentially about the longitudinal axis.

21. The method of claim 13 further comprising:
milling a plurality of channels in the second panel to leave ribs.

\* \* \* \* \*